(12) United States Patent
Bae et al.

(10) Patent No.: US 9,535,301 B2
(45) Date of Patent: Jan. 3, 2017

(54) LIQUID CRYSTAL DISPLAY DEVICE

(71) Applicant: Samsung Display Co., Ltd., Yongin-si, Gyeonggi-do (KR)

(72) Inventors: Sung-Hwan Bae, Asan-si (KR); Seung Ki Song, Suwon-si (KR); Young-Min Jung, Gwangmyeong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/875,478

(22) Filed: Oct. 5, 2015

(65) Prior Publication Data

US 2016/0195788 A1   Jul. 7, 2016

(30) Foreign Application Priority Data

Jan. 6, 2015 (KR) .................. 10-2015-0001280

(51) Int. Cl.
 *H01L 27/14* (2006.01)
 *G02F 1/1362* (2006.01)
 *G02F 1/1343* (2006.01)

(52) U.S. Cl.
 CPC ..... *G02F 1/136286* (2013.01); *G02F 1/13624* (2013.01); *G02F 1/136227* (2013.01); *G02F 2001/134345* (2013.01); *G02F 2001/136218* (2013.01)

(58) Field of Classification Search
 CPC .................. G02F 1/13624; G02F 1/136286
 USPC ......................................................... 257/72
 See application file for complete search history.

(56) References Cited

U.S. PATENT DOCUMENTS

| | | |
|---|---|---|
| 2007/0296898 A1 | 12/2007 | Cho et al. |
| 2008/0068527 A1 | 3/2008 | Um et al. |
| 2008/0174708 A1 | 7/2008 | Yoo et al. |
| 2012/0236238 A1 | 9/2012 | Kim et al. |
| 2013/0335393 A1 | 12/2013 | Wang |

FOREIGN PATENT DOCUMENTS

| | | |
|---|---|---|
| KR | 10-2008-0097793 A | 11/2008 |
| KR | 10-2010-0070663 A | 6/2010 |
| KR | 10-2011-0038477 A | 4/2011 |
| KR | 10-2013-0034700 A | 4/2013 |
| KR | 10-2014-0061611 A | 5/2014 |

*Primary Examiner* — Douglas Menz
(74) *Attorney, Agent, or Firm* — Innovation Counsel LLP

(57) ABSTRACT

A liquid crystal display is presented that includes: an auxiliary electrode protruding from a gate line; a third gate electrode protruding from the gate line; a first source electrode and a second source electrode connected to a data line and overlapping the first gate electrode and the second gate electrode, respectively; a first drain electrode overlapping the first gate electrode and the auxiliary electrode; a second drain electrode overlapping the second gate electrode; a third source electrode overlapping the third gate electrode; a third drain electrode overlapping the third gate electrode and connected to a storage electrode line; first and second subpixel electrodes connected to the first and second drain electrodes, respectively, wherein a connection between the first drain electrode and the first subpixel electrode and a connection between the second drain electrode and the second subpixel electrode are adjacent to each other.

25 Claims, 18 Drawing Sheets

LIQUID CRYSTAL DISPLAY DEVICE

CROSS-REFERENCE TO RELATED APPLICATION

This application claims priority to and the benefit of Korean Patent Application No. 10-2015-0001280 filed in the Korean Intellectual Property Office on Jan. 6, 2015, the entire content of which is incorporated herein by reference.

BACKGROUND (a) Technical Field

The present disclosure relates to a liquid crystal display. More particularly, the present disclosure relates to a liquid crystal display with improved transmittance.

(b) Description of the Related Art

Liquid crystal displays (LCDs) are one of the most widely used flat panel displays today. Typically, an LCD includes a pair of panels provided with field-generating electrodes and a liquid crystal (LC) layer interposed between the two panels. The LCD displays images by applying signals to the field-generating electrodes to generate an electric field in the LC layer that determines the orientation of LC molecules in the LC layer, thereby adjusting polarization of incident light.

The liquid crystal display includes a thin film transistor array panel and a common electrode panel facing each other. The thin film transistor array panel includes a gate line transmitting a gate signal and a data line transmitting a data signal, and intersecting each other, a thin film transistor connected to the gate line and the data line, and a pixel electrode connected to the thin film transistor. The common electrode panel includes a light blocking member, a color filter, and a common electrode.

The liquid crystal display has room for improvement in visibility and viewing angle, and thus various modes of liquid crystal displays have been developed in order to solve the problems. However, even though there have been improvements in the visibility and viewing angle, there are still problems that prevent a desired pattern from properly forming, for example due to misalignment of a mask. That is, an overlapping area between the gate electrode and source/drain electrode may be varied due to misalignment of the mask. As a result, a striped pattern may be displayed in a direction perpendicular to the data line.

Also, an insulating layer is formed between the thin film transistor and the pixel electrode, and a contact hole is formed in the insulating layer to allow interlayer connection. A light blocking member is formed to prevent light leakage at a portion in which the thin film transistor and the contact hole are formed. When forming a plurality of contact holes in one pixel, as the contact holes are designed to have a sufficient margin, a light blocking area is increased such that transmittance is decreased.

The above information disclosed in this Background section is only for enhancement of understanding of the background of the invention and therefore it may contain information that does not form the prior art that is already known in this country to a person of ordinary skill in the art.

SUMMARY

The present disclosure provides a liquid crystal display having improved transmittance.

A liquid crystal display according to an exemplary embodiment includes: a first substrate; a gate line, a data line, and a storage electrode line positioned on the first substrate; a first gate electrode and a second gate electrode protruding from the gate line; an auxiliary electrode protruding from the gate line in the same direction as the first gate electrode; a third gate electrode protruding from the gate line in the same direction as the second gate electrode; a first source electrode connected to the data line and overlapping the first gate electrode; a second source electrode connected to the data line and overlapping the second gate electrode; a first drain electrode separated from the first source electrode and overlapping the first gate electrode and the auxiliary electrode; a second drain electrode separated from the second source electrode and overlapping the second gate electrode; a third source electrode connected to the second drain electrode and overlapping the third gate electrode; a third drain electrode separated from the third source electrode, overlapping the third gate electrode, and connected to the storage electrode line; a first subpixel electrode connected to the first drain electrode; and a second subpixel electrode connected to the second drain electrode, wherein a connection of the first drain electrode and the first subpixel electrode and a connection of the second drain electrode and the second subpixel electrode are adjacent to each other.

A first passivation layer positioned on the data line, the first source electrode, the second source electrode, the first drain electrode, the second drain electrode, the third source electrode, and the third drain electrode; and a second passivation layer positioned on the first passivation layer may be further included, wherein the first subpixel electrode and the second subpixel electrode are positioned on the second passivation layer, the first passivation layer has a first contact hole exposing at least a portion of the first drain electrode and a second contact hole exposing at least a portion of the second drain electrode, and the second passivation layer has a single opening overlapping the first contact hole and the second contact hole.

The opening may expose a portion of the first passivation layer positioned between the first contact hole and the second contact hole.

The first passivation layer may be formed of an inorganic insulating material, and the second passivation layer may be formed of an organic insulating material.

The second passivation layer may be formed of a color filter.

The first contact hole may be positioned between the first gate electrode and the auxiliary electrode.

The first drain electrode may include a first bar part overlapping the first gate electrode, a first expansion part extending from the first bar part and positioned between the first gate electrode and the auxiliary electrode, and a second bar part extending from the first expansion part and overlapping the auxiliary electrode.

The first contact hole may expose the first expansion part.

A storage electrode overlapping an edge of the first subpixel electrode and the second subpixel electrode, and a first electrode extending from the storage electrode and overlapping the first expansion part of the first drain electrode, may be further included.

The first bar part, the first expansion part, and the second bar part may be positioned in the direction parallel to the gate line on one straight line.

The second contact hole may be positioned between the second gate electrode and the third gate electrode.

The second drain electrode may include a third bar part overlapping the second gate electrode and a second expansion part extended from the third bar part and positioned between the second gate electrode and the third gate electrode.

The second contact hole may expose the second expansion part.

A storage electrode overlapping an edge of the first subpixel electrode and the second subpixel electrode, and a second electrode extended from the storage electrode and overlapping the second expansion part of the second drain electrode, may be further included.

The second bar part, the second expansion part, and the third bar part may be positioned in the direction parallel to the gate line on one straight line.

The first contact hole and the second contact hole may be positioned in the direction parallel to the data line on one straight line.

The first subpixel electrode and the second subpixel electrode may respectively include a crossed-shaped branch unit including a horizontal stem and a vertical stem, and a minute branch extended from the crossed-shaped branch unit, and the storage electrode line may overlap the vertical stem.

The storage electrode line may be positioned at the same layer as the data line.

The first gate electrode, the second gate electrode, the third gate electrode, and the auxiliary electrode may protrude from the gate line on a plane.

The first gate electrode and the auxiliary electrode may protrude from the gate line, and the second gate electrode and the third gate electrode may protrude from the gate in an opposite direction from the first gate electrode and the auxiliary electrode.

A shielding electrode overlapping the data line may be further included.

The shielding electrode may be positioned at the same layer as the first subpixel electrode and the second subpixel electrode.

A connection electrode connecting the adjacent shielding electrodes may be further included.

The connection electrode may overlap the gate line.

The connection electrode may be positioned between the first contact hole and the second contact hole.

The described liquid crystal display according to an exemplary embodiment of the present invention has effects as follows.

In the liquid crystal display according to an exemplary embodiment of the present disclosure, the first drain electrode overlaps the auxiliary electrode, and if a misalignment of a mask is generated, an overlapping area of the gate electrode and the source/drain electrode is not changed.

Also, an opening formed in the second passivation layer is formed as a single opening while overlapping the first contact hole and the second contact hole formed in the first passivation layer such that the area of the light blocking region is reduced, thereby improving transmittance.

DETAILED DESCRIPTION OF THE EMBODIMENTS

Figure 1:
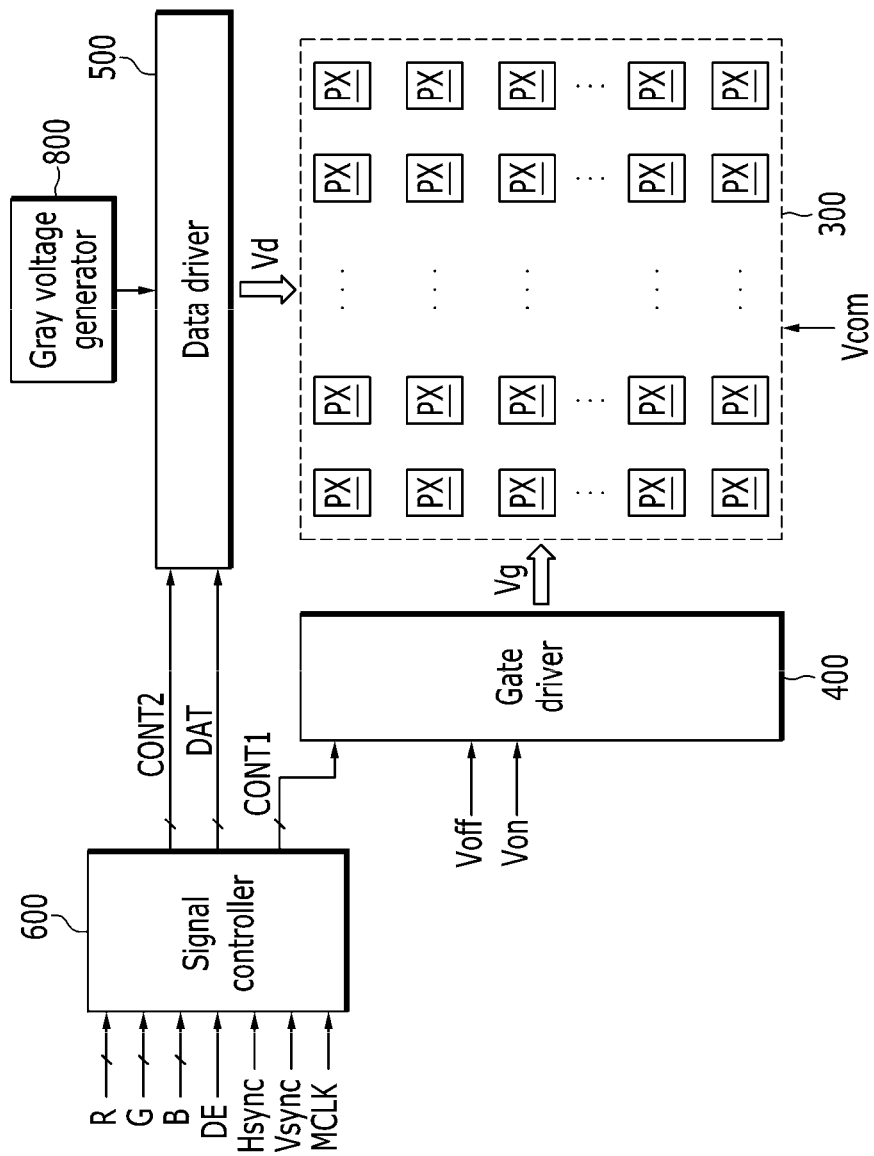
FIG. 1 is a block diagram of a liquid crystal display according to an exemplary embodiment of the inventive concept.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment will be described below with reference to accompanying drawings.

Figure 2:
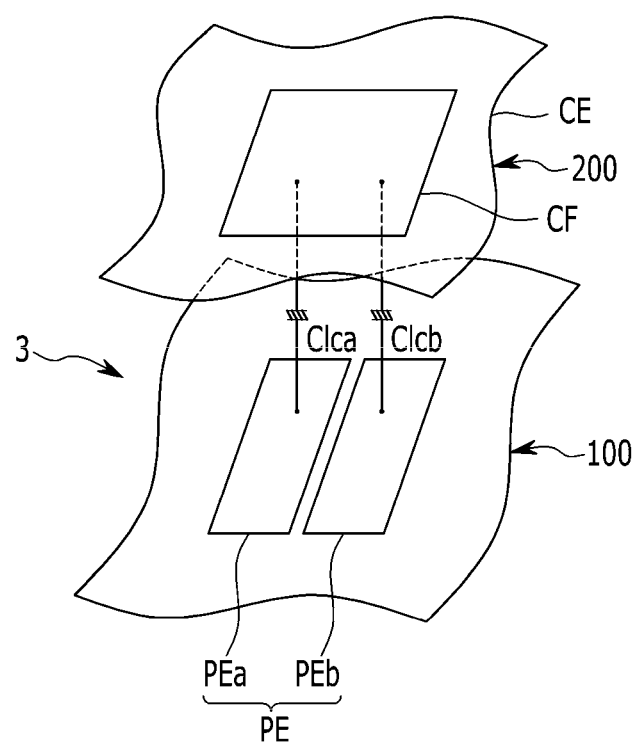
FIG. 2 is an equivalent circuit diagram illustrating a single pixel together with a structure of a liquid crystal display according to an exemplary embodiment of the inventive concept.

FIG. 1 is a block diagram of a liquid crystal display according to an exemplary embodiment and FIG. 2 is an equivalent circuit diagram illustrating a single pixel together with a structure of a liquid crystal display according to an exemplary embodiment of the disclosure.

As illustrated in FIG. 1, the liquid crystal display according to the exemplary embodiment includes a liquid crystal panel assembly 300, a gate driver 400 and a data driver 500 connected to the liquid crystal panel assembly 300, a gray scale voltage generator 800 connected to the data driver 500, and a signal controller 600 controlling the liquid crystal panel assembly 300, the gate driver 400, the data driver 500, and the gray scale voltage generator 800.

The liquid crystal panel assembly 300 includes a plurality of signal lines (not illustrated) and a plurality of pixels PX connected to the plurality of signal lines and arranged approximately in a matrix form in an equivalent circuit view. As seen from the structure shown in FIG. 2, the liquid crystal panel assembly 300 includes a thin film transistor array panel 100 and an opposite display panel 200 which face each other, and a liquid crystal layer 3 interposed therebetween.

The signal lines include a plurality of gate lines (not shown) that transmit a gate signal (also referred to as a "scanning signal") and a plurality of data lines (not shown) that transmits a data signal. The gate lines substantially extend in a row direction and are substantially parallel to each other. Further, the data lines substantially extend in a column direction and are substantially parallel to each other.

Figure 3:
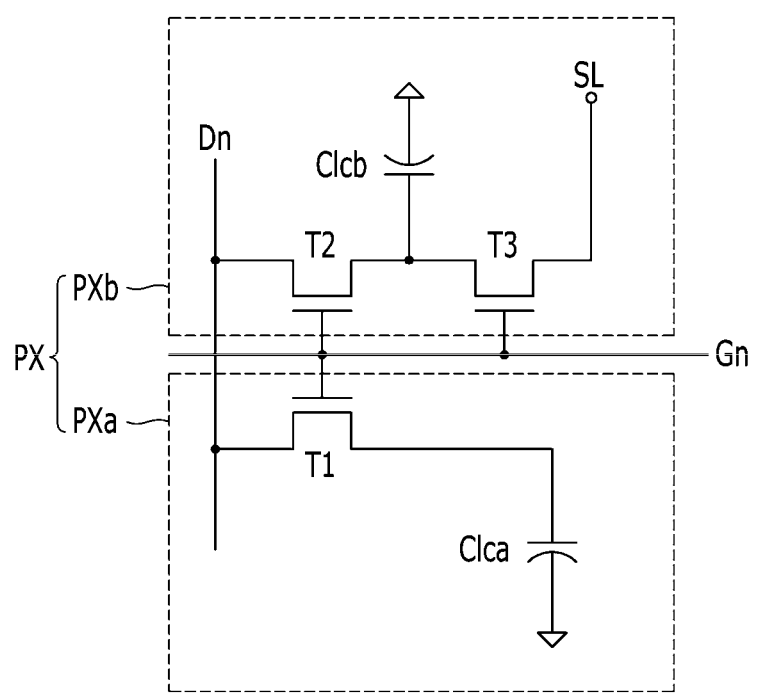
FIG. 3 is an equivalent circuit diagram of a single pixel of a liquid crystal display according to an exemplary embodiment of the inventive concept.

Each of the pixels PX includes a pair of subpixels PXa and PXb, as shown in FIG. 3. The subpixels PXa and PXb respectively include liquid crystal capacitors Clca and Clcb. At least one of two subpixels includes a switching element (not shown) that is connected to the gate line, the data line, and the liquid crystal capacitors Clca and Clcb.

The liquid crystal capacitors Clca and Clcb respectively include the subpixel electrodes PEa and PEb of the thin film transistor array panel 100 and a common electrode CE of the opposite display panel 200 as two terminals, and the liquid crystal layer 3 between the subpixel electrodes PEa/PEb and the common electrode CE functions as a dielectric material. A pair of subpixel electrodes PEa and PEb are separated from each other and constitute a single pixel electrode PE. The common electrode CE is formed on an entire surface of the opposite display panel 200 and a common voltage Vcom is applied thereto. The liquid crystal layer 3 has positive dielectric anisotropy, and liquid crystal molecules of the liquid crystal layer 3 are oriented such that the directions of the liquid crystal molecules are twisted at 90° in a state where no electric field is applied.

In order to materialize color representation, by allowing the pixel PX to uniquely display any one of primary colors (spatial division) or to alternatively display primary colors in accordance with time (temporal division), a desired color may be recognized by spatial or temporal sums of the primary colors. Examples of the primary colors include three primary colors such as red, green, and blue. FIG. 2 is an example of spatial division, and shows that each of the pixels PX includes a color filter CF indicating one of primary colors in a region of the opposite display panel 200. Differently from FIG. 2, the color filter CF may be formed on or below the subpixel electrodes PEa and PEb of the thin film transistor array panel 100.

At least one of polarizers (not shown) that polarizes light is attached to an outer surface of the liquid crystal panel assembly 300.

Referring to FIG. 1 again, the gray voltage generator 800 generates all gray voltages or a limited number of gray voltages (hereinafter referred to as "reference gray voltages) related to transmittance of the pixel PX. The (reference) gray voltage may be positive or negative with respect to the common voltage Vcom.

The gate driver 400 is connected to the gate line of the liquid crystal panel assembly 300 to apply a gate signal Vg formed of a combination of a gate-on voltage Von and a gate-off voltage Voff to the gate line.

The data driver 500 is connected to the data line of the liquid crystal panel assembly 300, selects a gray voltage from the gray voltage generator 800, and applies the selected gray voltage to the data line as a data signal. However, when the gray voltage generator 800 does not provide the voltage for all gray levels, but provides a predetermined number of reference gray voltages, the data driver 500 divides the reference gray voltages to generate a gray voltage for all gray levels and then select a data signal among them.

The signal controller 600 controls the gate driver 400 and the data driver 500.

Such drivers 400, 500, 600, and 800 may be directly installed on the liquid crystal panel assembly 300 in a form of at least one IC chip or may be installed on a flexible printed circuit film (not shown) to be attached on the liquid crystal panel assembly 300 as a form of a tape carrier package (TCP), or may be installed on a separate printed circuit board (PCB) (not shown). In some cases, the above-mentioned drivers 400, 500, 600, and 800 may be integrated in the liquid crystal panel assembly 300 together with the signal line and the thin film transistor switching element. In yet other cases, the drivers 400, 500, 600, and 800 may be integrated as a single chip. In this case, at least one driver or at least one circuit element that constitutes the driver may be disposed outside the single chip.

Next, a liquid crystal display according to an exemplary embodiment will be further described with reference to FIG. 3 to FIG. 10 in addition to FIG. 1 and FIG. 2.

Figure 4:
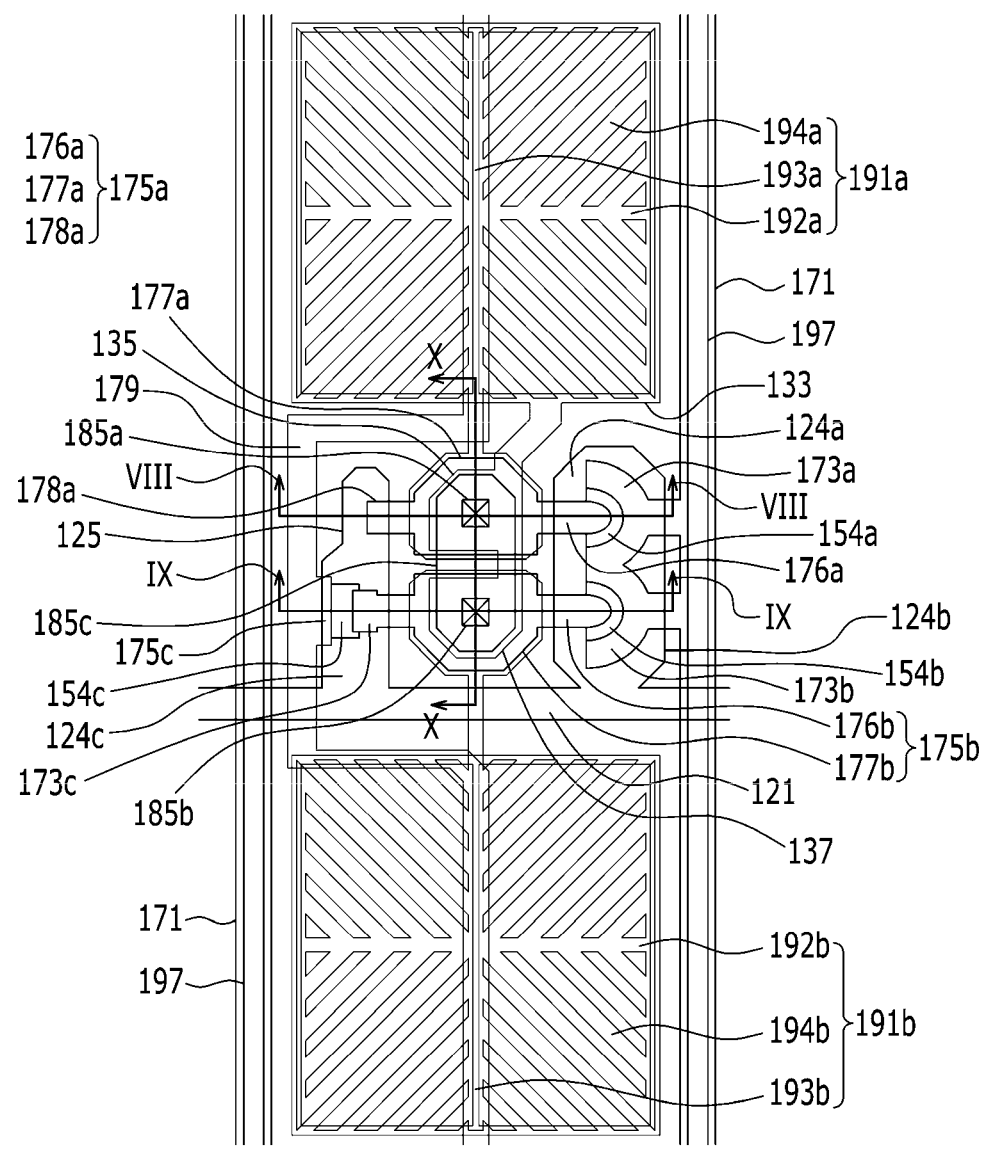
FIG. 4 is a top plan view of a thin film transistor array panel of a liquid crystal display according to an exemplary embodiment of the inventive concept.
Figure 5:
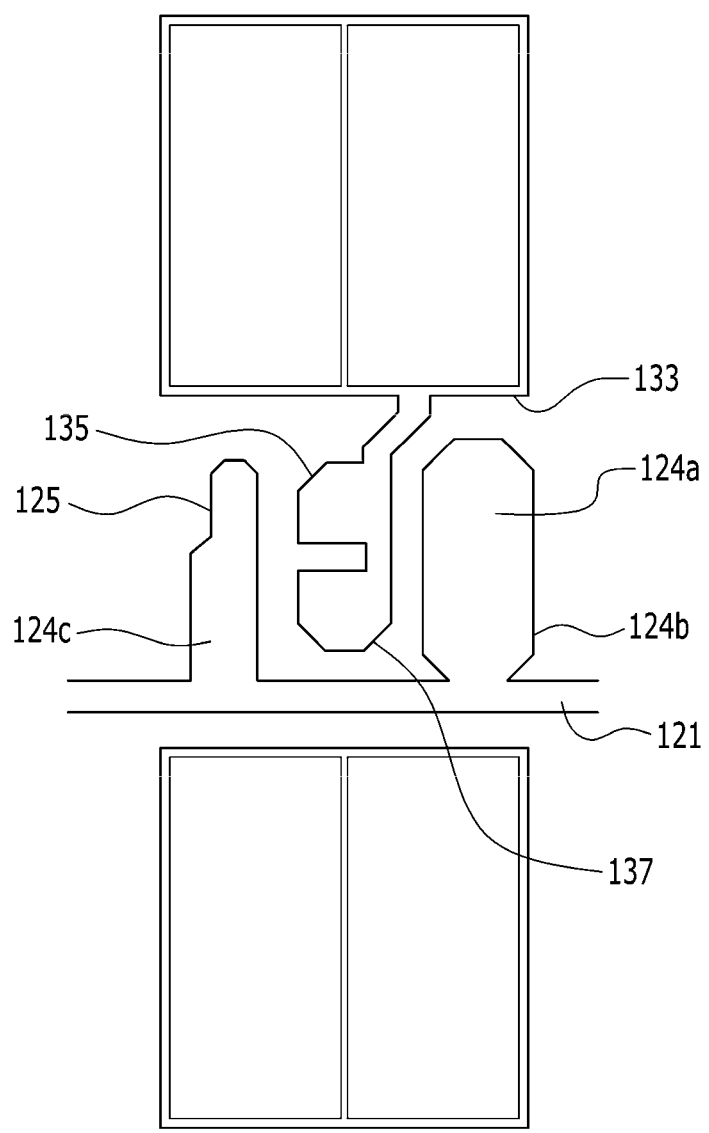
FIGS. 5, 6, and FIG. 7 are top plan views showing a partial layer of a liquid crystal display according to an exemplary embodiment of the inventive concept, respectively.
Figure 6:
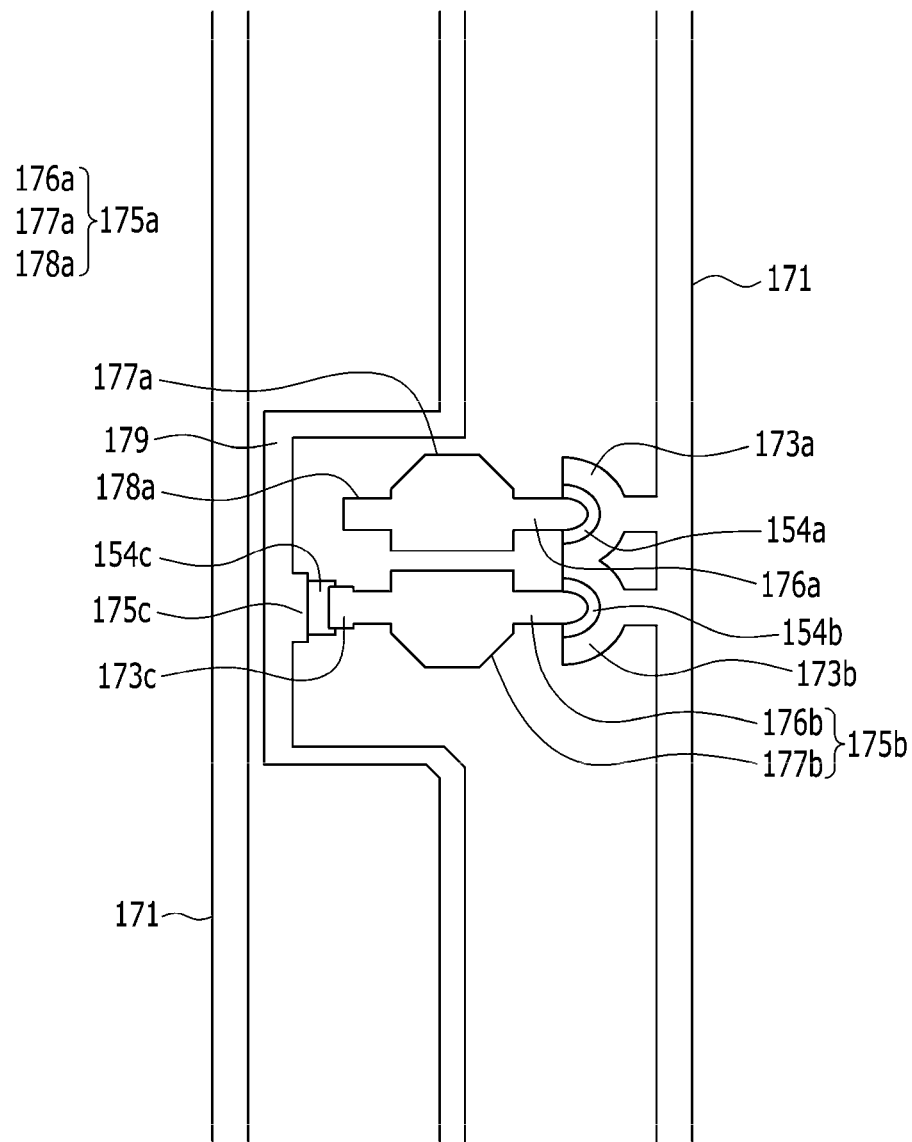
Figure 7:
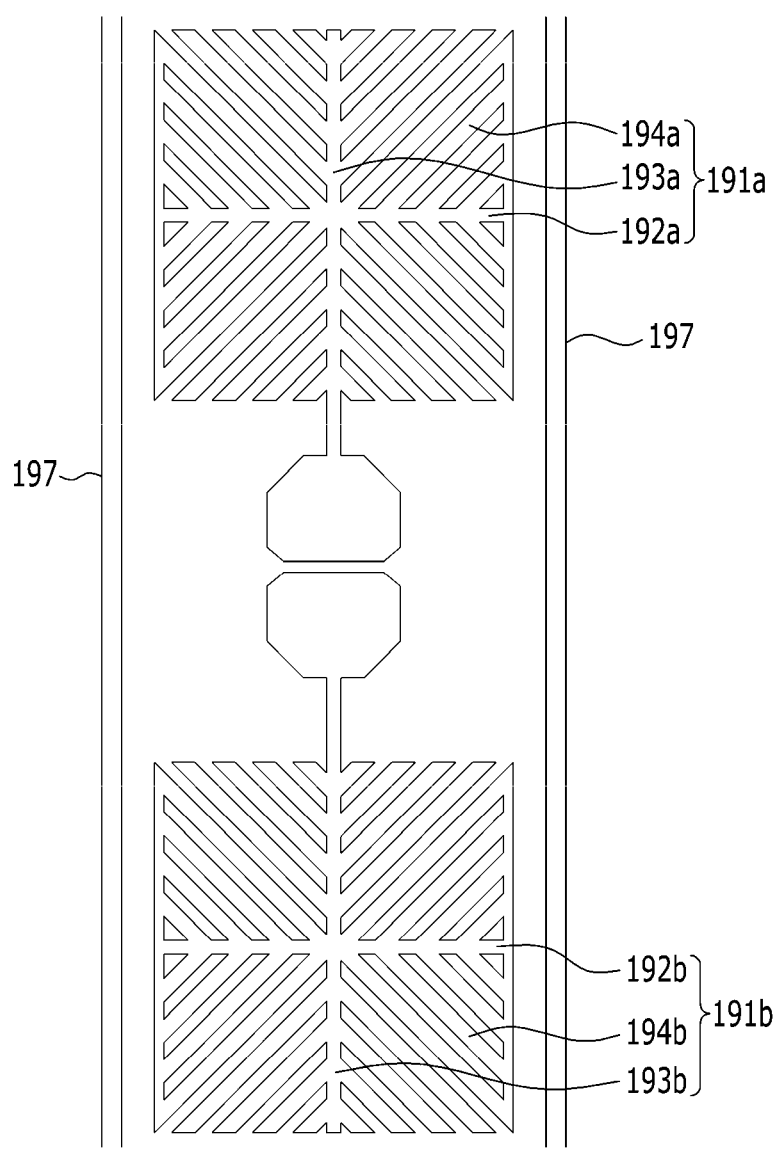
Figure 8:
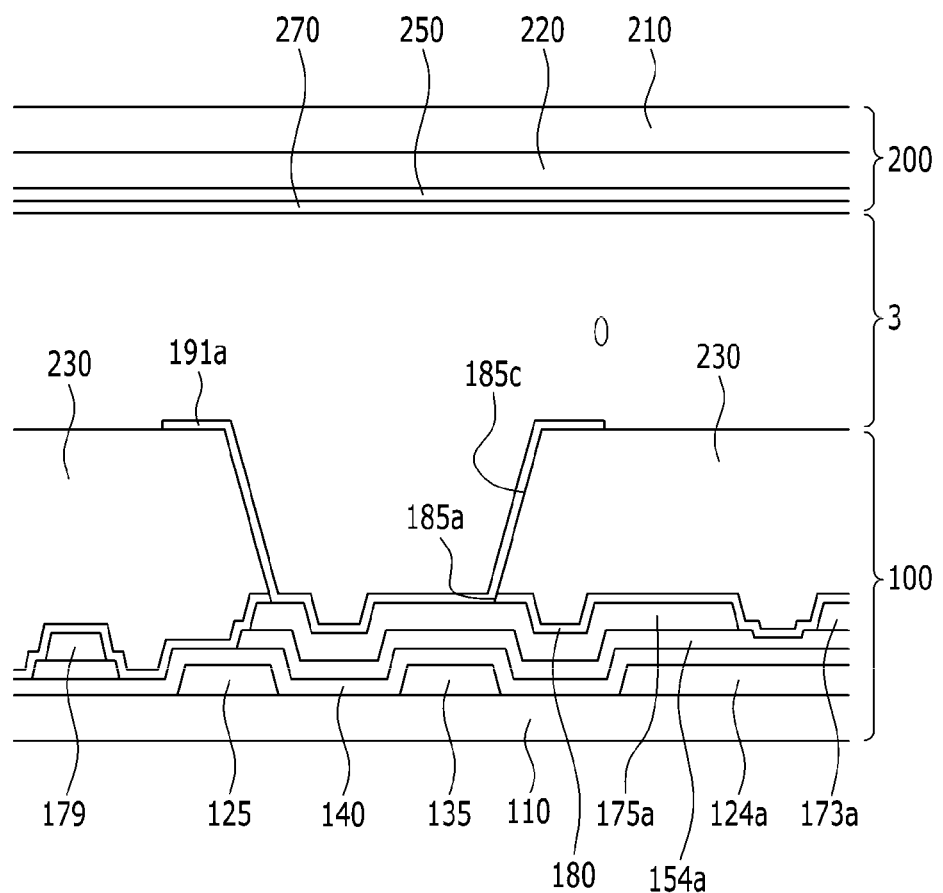
FIG. 8 is a cross-sectional view of a thin film transistor array panel of a liquid crystal display according to an exemplary embodiment of the inventive concept taken along a line VIII-VIII of FIG. 4.
Figure 9:
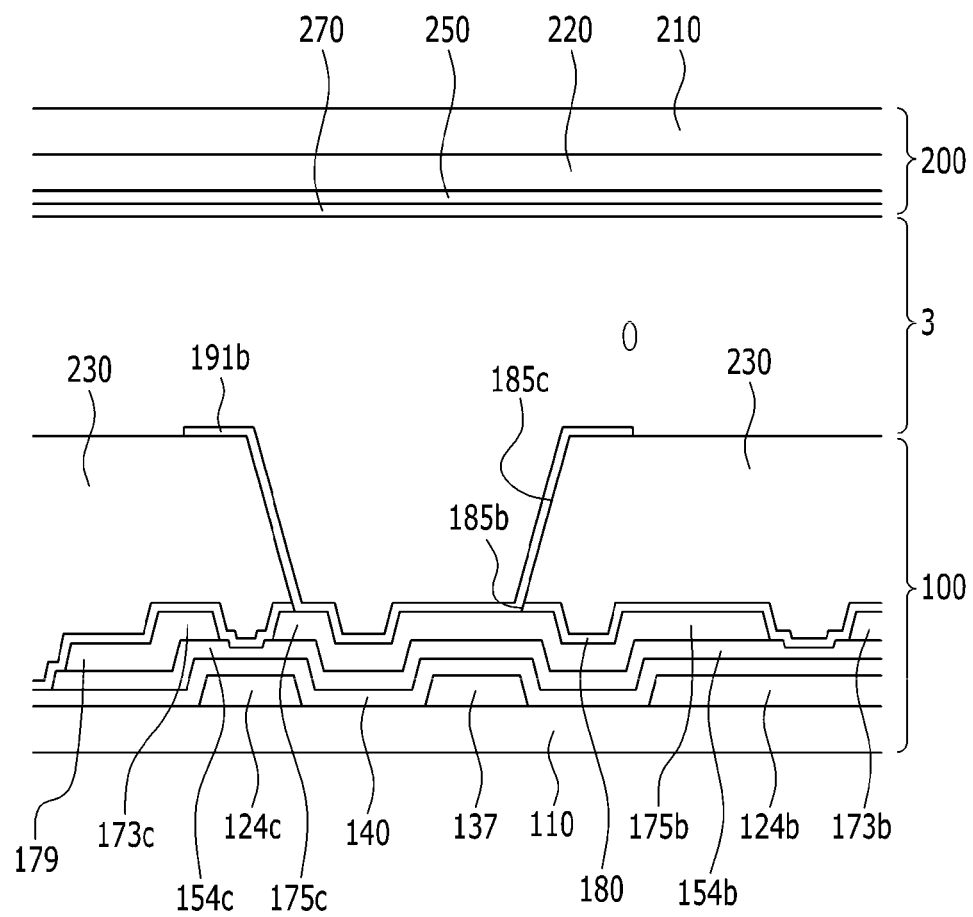
FIG. 9 is a cross-sectional view of a thin film transistor array panel of a liquid crystal display according to an exemplary embodiment of the inventive concept taken along a line IX-IX of FIG. 4.
Figure 10:
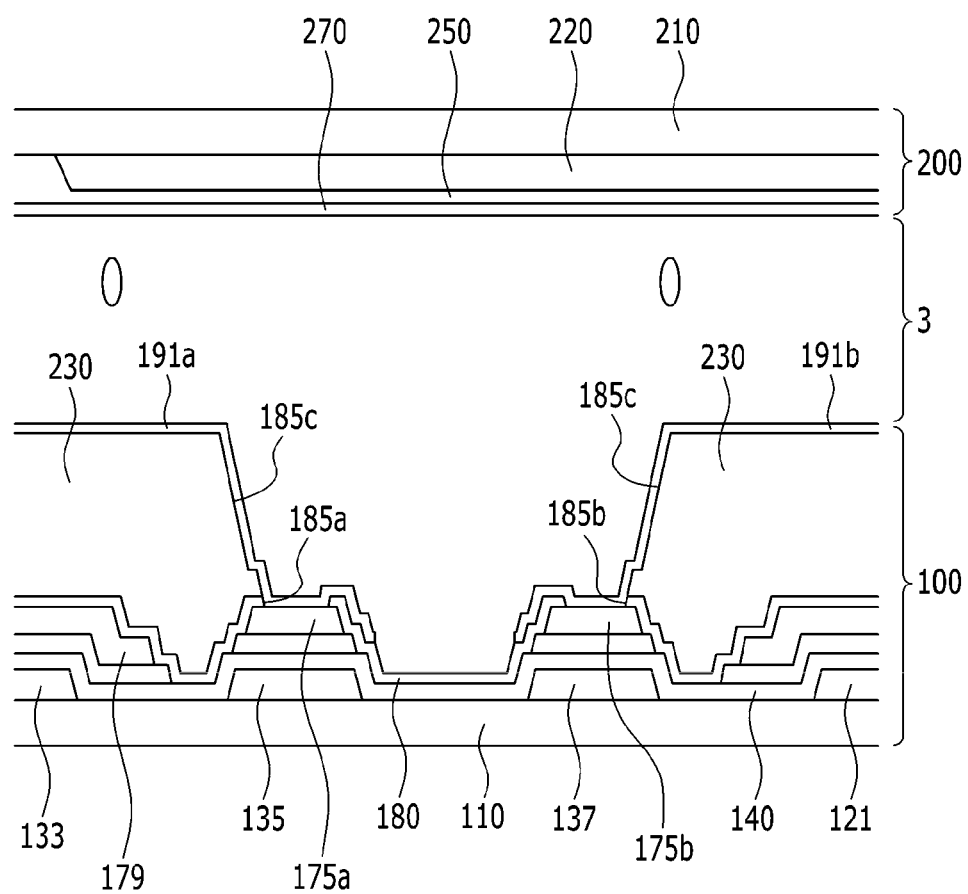
FIG. 10 is a cross-sectional view of a thin film transistor array panel of a liquid crystal display according to an exemplary embodiment of the inventive concept taken along a line X-X of FIG. 4.

FIG. 3 is an equivalent circuit diagram of a single pixel of a liquid crystal display according to an exemplary embodiment, FIG. 4 is a top plan view of a thin film transistor array panel of a liquid crystal display according to an exemplary embodiment, and FIGS. 5, 6, and 7 are top plan views showing a partial layer of a liquid crystal display according to an exemplary embodiment. FIG. 5 shows a gate metal layer, FIG. 6 shows a data metal layer, and FIG. 7 shows a layer in which a first subpixel electrode, a second subpixel electrode, and a shielding electrode are formed. FIG. 8 is a cross-sectional view of a thin film transistor array panel of a liquid crystal display according to an exemplary embodiment taken along a line VIII-VIII of FIG. 4, FIG. 9 is a cross-sectional view of a thin film transistor array panel of a liquid crystal display according to an exemplary embodiment taken along a line IX-IX of FIG. 4, and FIG. 10 is a cross-sectional view of a thin film transistor array panel of a liquid crystal display according to an exemplary embodiment taken along a line X-X of FIG. 4.

Referring to FIG. 1 and FIG. 3, the liquid crystal display according to an exemplary embodiment of the present invention includes a plurality of signal lines Gn, Dn, and SL, and a plurality of pixels PX connected to the signal lines.

The signal lines Gn, Dn, and SL include a gate line Gn that transmits a gate signal (also referred to as a "scanning signal"), a data line Dn that transmits a data voltage, and a storage electrode line SL to which a constant voltage is applied.

A first thin film transistor T1 and a second thin film transistor T2 that are connected to the same gate line (Gn) and the same data line (Dn) are formed. Further, a third thin film transistor T3 that is connected to the same gate line Gn as the first and second thin film transistors T1 and T2 and connected to the second thin film transistor T2 and the storage electrode line SL is further formed.

Each pixel PX includes two subpixels PXa and PXb. A first liquid crystal capacitor Clca that is connected to the first thin film transistor T1 is formed in the first subpixel PXa. Further, a second liquid crystal capacitor Clcb that is connected to the second thin film transistor T2 is formed in the second subpixel PXb.

A first terminal of the first thin film transistor T1 is connected to the gate line Gn, a second terminal thereof is connected to the data line Dn, and a third terminal thereof is connected to the first liquid crystal capacitor Clca. A first terminal of the second thin film transistor T2 is connected to the gate line Gn, a second terminal thereof is connected to the data line Dn, and a third terminal thereof is connected to the second liquid crystal capacitor Clcb. A first terminal of the first thin film transistor T3 is connected to the gate line Gn, a second terminal thereof is connected to the third terminal of the second thin film transistor T2, and a third terminal thereof is connected to the storage electrode line SL.

In the operation of the liquid crystal display according to an exemplary embodiment of the present invention, when the gate-on voltage is applied to the gate line Gn, the first to third thin film transistors T1 to T3 connected thereto are turned on, and the first liquid crystal capacitor Clca and the second liquid crystal capacitor Clcb are charged by the data voltage transmitted through the data line Dn.

In this case, since the third thin film transistor T3 is turned on, some of voltages charged in the second liquid crystal capacitor Clcb are leaked through the storage electrode line SL. Accordingly, even though the data voltages that are transmitted to the first subpixel PXa and the second subpixel PXb through the data line Dn are equal to each other, the voltages that are charged in the first liquid crystal capacitor Clca and the second liquid crystal capacitor Clcb are different from each other. That is, the voltage that is charged in the second liquid crystal capacitor Clcb is lower than the voltage that is charged in the first liquid crystal capacitor Clca. By making the voltages that are charged in different subpixels PXa and PXb in the same pixel PX different, the side visibility may be improved.

Hereinafter, the structure of the thin film transistor array panel of the liquid crystal display according to an exemplary embodiment of the present invention will be described with reference to FIG. 4 to FIG. 10.

First, the thin film transistor array panel 100 will be described.

A gate metal layer including a gate line 121, a first gate electrode 124a, a second gate electrode 124b, an auxiliary electrode 125, and a third gate electrode 124c is formed on a first substrate 110 made of transparent glass or plastic.

The gate line 121 mainly extends in a horizontal direction and transmits the gate signal. The first gate electrode 124a and the second gate electrode 124b protrude from the gate line 121 to be connected to each other. The first gate electrode 124a and the second gate electrode 124b protrude upwardly from the gate line 121 on a plane, and the first gate electrode 124a may be positioned on the second gate electrode 124b. The auxiliary electrode 125 and the third gate electrode 124c protrude from the gate line 121 to be connected to each other. The auxiliary electrode 125 and the third gate electrode 124c protrude upwardly from the gate line 121 on a plane, and the auxiliary electrode 125 may be positioned on the third gate electrode 124c.

The first gate electrode 124a and the auxiliary electrode 125 are separated from each other by a predetermined interval. The second gate electrode 124b and the third gate electrode 124c are separated from each other by a predetermined interval.

The first gate electrode 124a, the second gate electrode 124b, the third gate electrode 124c, and the auxiliary electrode 125 are connected to the same gate line 121, thereby receiving the same gate signal.

A storage electrode 133 may be further formed on the first substrate 110. The storage electrode 133 may be formed to enclose an edge of two subpixels PXa and PXb. Also, the storage electrode 133 may be further formed at a center of two subpixels PXa and PXb, perhaps extending in a column direction. The plurality of storage electrodes 133 positioned at the adjacent pixels PX are connected to each other. The storage electrode 133 is applied with a predetermined voltage such as a common voltage.

A first electrode 135 and a second electrode 137 extending from the storage electrode 133 may be further formed. The first electrode 135 is positioned between the first gate electrode 124a and the auxiliary electrode 125, and the second electrode 137 is positioned between the second gate electrode 124b and the third gate electrode 124c. The first electrode 135 and the second electrode 137 are connected to the storage electrode 133 to receive the predetermined voltage.

A gate insulating layer 140 is formed on the gate line 121, the first gate electrode 124a, the second gate electrode 124b, the third gate electrode 124c, the storage electrode 133, the first electrode 135, and the second electrode 137. The gate insulating layer 140 may be made of an inorganic insulating material such as a silicon nitride (SiNx) and a silicon oxide (SiOx). Further, the gate insulating layer 140 may be formed in a single layer or a multilayer.

A first semiconductor layer 154a, a second semiconductor layer 154b, and a third semiconductor layer 154c are formed on the gate insulating layer 140. The first semiconductor layer 154a may be located on the first gate electrode 124a, the second semiconductor layer 154b may be located on the second gate electrode 124b, and the third semiconductor layer 154c may be located on the third gate electrode 124c. The first semiconductor 154a, the second semiconductor 154b, and the third semiconductor 154c may be made of amorphous silicon, polycrystalline silicon, or a metal oxide.

Although not shown, ohmic contacts may be positioned on the first semiconductor 154a, the second semiconductor 154b, and the third semiconductor 154c, respectively. The ohmic contacts may be made of a silicide or a material such as n+ hydrogenated amorphous silicon in which an n-type impurity is doped at a high concentration.

A data metal layer including a storage electrode line 179, a data line 171, a first source electrode 173a, a first drain electrode 175a, a second source electrode 173b, a second drain electrode 175b, a third source electrode 173c, and a third drain electrode 175c is formed on the first, second, and third semiconductors 154a, 154b, and 154c and the gate insulating layer 140.

As shown, the first, second and third semiconductors 154a, 154b, and 154c may be formed under the data line 171. Also, the first semiconductor 154a and the second semiconductor 154b may be connected to each other, and the second semiconductor 154b may be connected to the third semiconductor 154c. However, the present invention is not limited thereto, and the first, second, and third semiconductors 154a, 154b, and 154c may only be formed on the first, second, and third gate electrodes 124a, 124b, and 124c, and the first semiconductor 154a, the second semiconductor 154b, and the third semiconductor 154c may be separated from each other.

The storage electrode line 179 transmits a predetermined voltage and mainly extends in the column direction, thereby crossing the gate line 121. The storage electrode line 179 may be formed in the column direction at the center of each of the subpixels PXa and PXb. The storage electrode line 179 may overlap the storage electrode 133. The storage electrode line 179 is formed to detour to the edge in the region between the two subpixels PXa and PXb. The storage electrode line 179 does not overlap the first gate electrode 124a, the second gate electrode 124b, the auxiliary electrode 125, the first electrode 135, or the second electrode 137. The storage electrode line 179 may be applied with the same voltage as that applied to the storage electrode 133 or a different voltage. For example, the voltage applied to the storage electrode line 179 and the voltage applied to the storage electrode 133 may have a difference of about 3 V.

The data line 171 transmits the data signal and mainly extends in the column direction, thereby crossing the gate line 121. The data line 171 is formed in the direction about parallel to the storage electrode line 179 and at the same layer as the storage electrode line 179.

The first source electrode 173a is formed to be protruded on the first gate electrode 124a from the data line 171. The first source electrode 173a may have a shape that is bent into a "C" shape on the first gate electrode 124a.

The first drain electrode 175a is formed to be separated from the first source electrode 173a on the first gate electrode 124a. A channel is formed in the first semiconductor 154a that is exposed between the first source electrode 173a and the first drain electrode 175a that are separated from each other.

The first drain electrode 175a includes a first bar part 176a overlapping the first gate electrode 124a, a first expansion part 177a extended from the first bar part 176a, and a second bar part 178a extended from the first expansion part 177a. The first bar part 176a is enclosed by the first source electrode 173a. The first expansion part 177a is formed with a wider width than the first bar part 176a, and is positioned between the first gate electrode 124a and the auxiliary electrode 125. The first expansion part 177a may overlap the first electrode 135. The second bar part 178a overlaps the auxiliary electrode 125.

The first bar part 176a, the first expansion part 177a, and the second bar part 178a of the first drain electrode 175a may be positioned on a straight line in the direction parallel to the gate line 121.

The second source electrode 173b is protruded from the data line 171 on the second gate electrode 124b. The second source electrode 173b may have the shape that is bent into the "C" shape on the second gate electrode 124b.

The second drain electrode 175b is formed on the second gate electrode 124b to be separated from the second source electrode 173b. A channel is formed in the second semiconductor 154b that is exposed between the second source electrode 173b and the second drain electrode 175b that are separated from each other.

The second drain electrode 175b includes a third bar part 176b overlapping the second gate electrode 124b and a second expansion part 177b extended from the third bar part 176b. The third bar part 176b is enclosed by the second source electrode 173b. The second expansion part 177b is formed with a wider width than the third bar part 176b, and is positioned between the second gate electrode 124b and the third gate electrode 124c. The second expansion part 177b may overlap the second electrode 137.

The third source electrode 173c is connected to the second drain electrode 175b, particularly the second expansion part 177b of the second drain electrode 175b, and is positioned on the third gate electrode 124c. The third source electrode 173c is formed with the bar shape. The third source electrode 173c may have a portion overlapping the center portion of the third gate electrode 124c and having the wider width than the other portion.

The third bar part 176b, the second expansion part 177b, and the third source electrode 173c of the second drain electrode 175b may be positioned on a straight line in the direction parallel to the gate line 121.

The third drain electrode 175c is formed on the third gate electrode 124c to be separated from the third source electrode 173c. A channel is formed in the third semiconductor 154c that is exposed between the third source electrode 173c and the third drain electrode 175c that are separated from each other.

The first gate electrode 124a, first semiconductor 154a, the first source electrode 173a, and the first drain electrode 175a form a first thin film transistor. Also, the second gate electrode 124b, the second semiconductor 154b, the second source electrode 173b, and the second drain electrode 175b form a second thin film transistor. The third gate electrode 124c, the third semiconductor 154c, the third source electrode 173c, and the third drain electrode 175c form a third thin film transistor.

A first passivation layer 180 is formed on the data line 171, the first, second, and third source electrodes 173a, 173b, and 173c, and the first, second and third drain electrodes 175a, 175b, and 175c. The first passivation layer 180 may be made of the inorganic insulating material.

The first passivation layer 180 has a first contact hole 185a exposing at least portion of the first drain electrode 175a and a second contact hole 185b exposing at least a portion of the second drain electrode 175b. The first contact hole 185a may expose the first expansion part 177a of the first drain electrode 175a, and may be positioned between the first gate electrode 124a and the auxiliary electrode 125. Also, the first contact hole 185a may overlap the first electrode 135. The second contact hole 185b may expose the second expansion part 177b of the second drain electrode 175b, and may be positioned between the second gate electrode 124b and the third gate electrode 124c. Also, the second contact hole 185b may overlap the second electrode 137.

The first contact hole 185a and the second contact hole 185b are adjacent to each other. The first contact hole 185a and the second contact hole 185b are aligned in the column direction.

A second passivation layer 230 is formed on the first passivation layer 180. The second passivation layer 230 may be made of the organic insulating material, and particularly is a color filter. The color filter may display one of primary colors such as three primary colors of red, green, and blue. Examples of the primary colors may include three primary colors of red, green, and blue, or yellow, cyan, and magenta. Although not shown, the color filters may further include a color filter displaying a mixture of the primary colors or white as well as the primary colors.

The second passivation layer 230 has an opening 185c, and the opening 185c overlaps the first contact hole 185a and the second contact hole 185b. The opening 185c is formed as a single opening 185c, and is not formed at a position completely overlapping the first contact hole 185a and the position completely overlapping the second contact hole 185b. Accordingly, the opening 185c exposes the first passivation layer 180 positioned between the first contact hole 185a and the second contact hole 185b. The edge of the opening 185c encloses the edge of the first contact hole 185a and the second contact hole 185b.

A first subpixel electrode 191a and a second subpixel electrode 191b are formed on the second passivation layer 230.

The first subpixel electrode 191a is connected to the first drain electrode 175a through the first contact hole 185a and the opening 185c, and the second subpixel electrode 191b is connected to the second drain electrode 175b through the second contact hole 185b and the opening 185c. Particularly, the first subpixel electrode 191a may be connected to the first expansion part 177a of the first drain electrode 175a, and the second subpixel electrode 191b may be connected to the second expansion part 177b of the second drain electrode 175b.

The first subpixel electrode 191a and the first drain electrode 175a are connected to each other and the second subpixel electrode 191b and the second drain electrode 175b are connected to each other through the opening 185c. When the position of the opening 185c is changed by misalignment of a mask, connection errors may be generated. Accordingly, sufficient margin is designed. As well as the region where the opening 185c is formed, the region where the first, second, and third thin film transistors are formed is a region blocking light to prevent light leakage. Accordingly, as the size of the opening 185c is increased, the area of the light blocking region is increased such that the transmittance is decreased. In an exemplary embodiment of the present invention, the first contact hole 185a and the second contact hole 185b are disposed to be adjacent to each other, and the single opening 185c partially overlapping the first contact hole 185a and the second contact hole 185b is formed, thereby the transmittance may be improved while the margin to prevent the contact failure may be obtained.

The first subpixel electrode 191a and the second subpixel electrode 191b receive the data voltage from the first drain electrode 175a and the second drain electrode 175b, respectively. In this case, some of the data voltages applied to the second drain electrode 175b are divided through the third source electrode 173c, so that a size of the voltage applied to the second subpixel electrode 191b is smaller than a size of the voltage applied to the first subpixel electrode 191a. The aforementioned case is a case in which the voltage applied to the first subpixel electrode 191a and the second subpixel electrode 191b is positive (+). In a case where the voltage applied to the first subpixel electrode 191a and the second subpixel electrode 191b is negative (−), the voltage applied to the first subpixel electrode 191a is smaller than the voltage applied to the second subpixel electrode 191b.

Here, an area of the second subpixel electrode 191b may be equal to or larger than an area of the first subpixel electrode 191a and equal to or smaller than two times an area of the first subpixel electrode 191a.

The first subpixel electrode 191a neighbors the second subpixel electrode 191b in the column direction, and they respectively include a cross-shaped branch unit having a quadrangular shape and including horizontal stems 192a and 192b and vertical stems 193a and 193b crossing the horizontal stems 192a and 192b. Further, the first subpixel electrode 191a and the second subpixel electrode 191b are respectively divided into four subregions by the horizontal stems 192a and 192b and the vertical stems 193a and 193b, and each subregion includes a plurality of minute branches 194a and 194b.

One of the minute branches 194a and 194b disposed at the four subregions is disposed to obliquely extend from the horizontal stems 192a and 192b or the vertical stems 193a and 193b in an upper left direction, and another minute branch is disposed to obliquely extend from the horizontal stems 192a and 192b or the vertical stems 193a and 193b in an upper right direction. Further, another minute branch is disposed to obliquely extend from the horizontal stems 192a and 192b or the vertical stems 193a and 193b in a lower left direction, and the other minute branch is disposed to obliquely extend from the horizontal stems 192a and 192b or the vertical stems 193a and 193b in a lower right direction.

Each of the minute branches 194a and 194b form an angle of approximately 40° to 45° with the horizontal stems 192a and 192b or the gate line 121. Further, the minute branches 194a and 194b of two adjacent subregions may be perpendicular to each other.

A shielding electrode 197 may be formed on the second passivation layer 230. The shielding electrode 197 may be formed with the same layer as the first subpixel electrode 191a and the second subpixel electrode 191b. The shielding electrode 197 may overlap the data line 171. The shielding electrode 197 may be formed with a narrower width than the data line 171. The shielding electrode 197 may be applied with the predetermined voltage.

Next, the opposite display panel 200 will be described.

A light blocking member 220 is formed on a second substrate 210 made of transparent glass, plastics, or the like. The light blocking member 220 is called a black matrix and prevents light leakage. The light blocking member 220 may overlap the gate line 121, the data line 171, the first, second and third thin film transistors, the first contact hole 185a, the second contact hole 185b, and the opening 185c.

Although not shown, the plurality of color filters may be formed on the second substrate 210. In the present exemplary embodiment, the second passivation layer 230 may be formed of the color filter, and in this case, the color filter may be omitted on the second substrate 210.

An overcoat 250 may be formed on the light blocking member 220, and a common electrode 270 may be formed on the overcoat 250.

In above, the light blocking member 220 and the common electrode 270 are formed in the opposite display panel 200, however the inventive concept is not limited thereto. The light blocking member 220 and the common electrode 270 may be formed at the thin film transistor array panel 100.

Next, a parasitic capacitance formed by overlapping the gate electrode and the source/drain electrode with each other in the liquid crystal display according to an exemplary embodiment is maintained at a constant level in spite of misalignment of the mask, and will be described with reference to FIG. 11 to FIG. 13.

Figure 11:
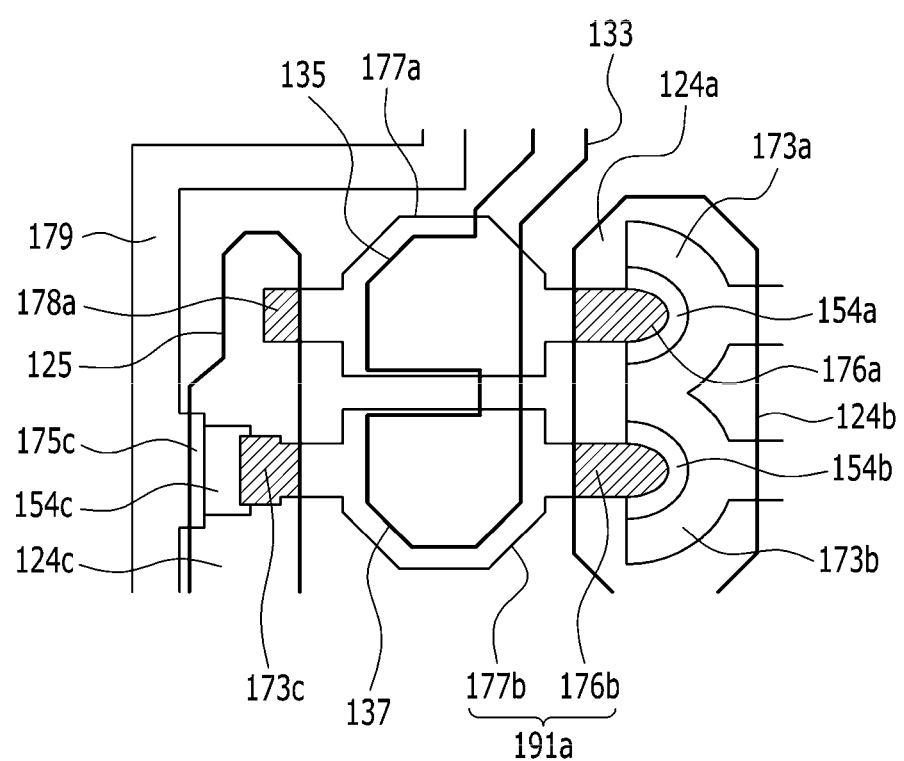
FIG. 11 is a top plan view of a partial region of FIG. 4.

FIG. 11 is a top plan view of a partial region of FIG. 4. FIG. 11 shows the first, second, and third thin film transistors and the surroundings thereof. FIG. 12 and FIG. 13 are top plan views showing a shape in which a partial layer is moved in FIG. 11. FIG. 12 shows a shape in which the data metal layer is moved in a direction D1 by the misalignment of the mask with respect to FIG. 11. FIG. 13 shows a shape in which the data metal layer is moved in a direction D2 by the misalignment of the mask with respect to FIG. 11.

Figure 12:
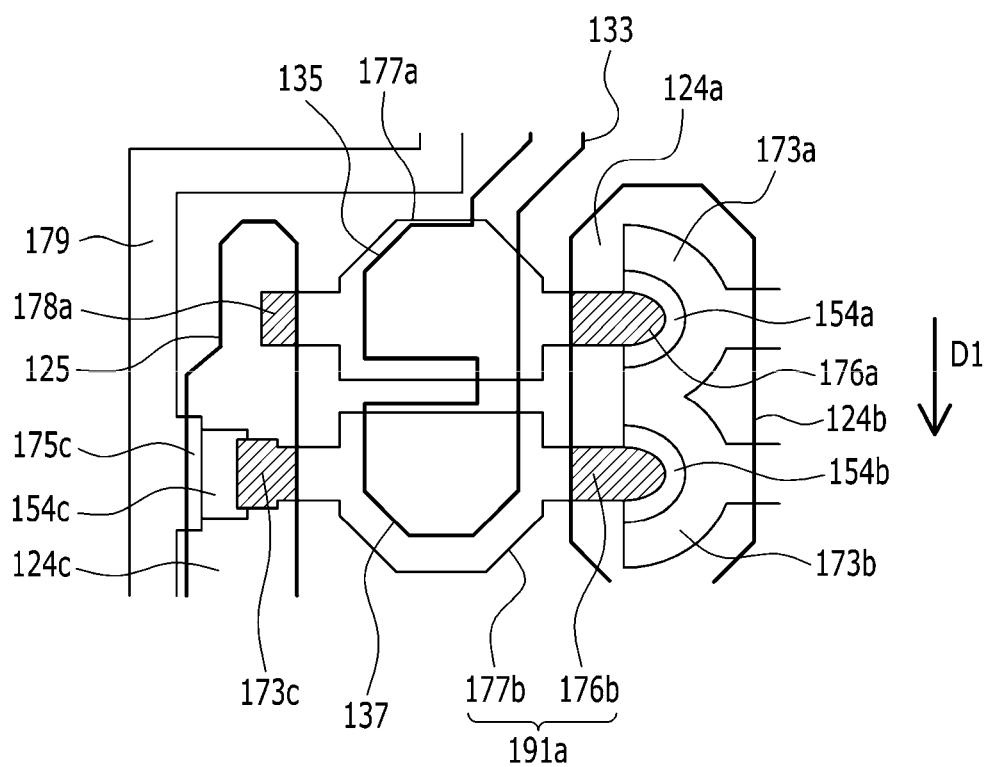
FIG. 12 and FIG. 13 are a top plan view showing a shape of a partial layer that is moved in FIG. 11.
Figure 13:
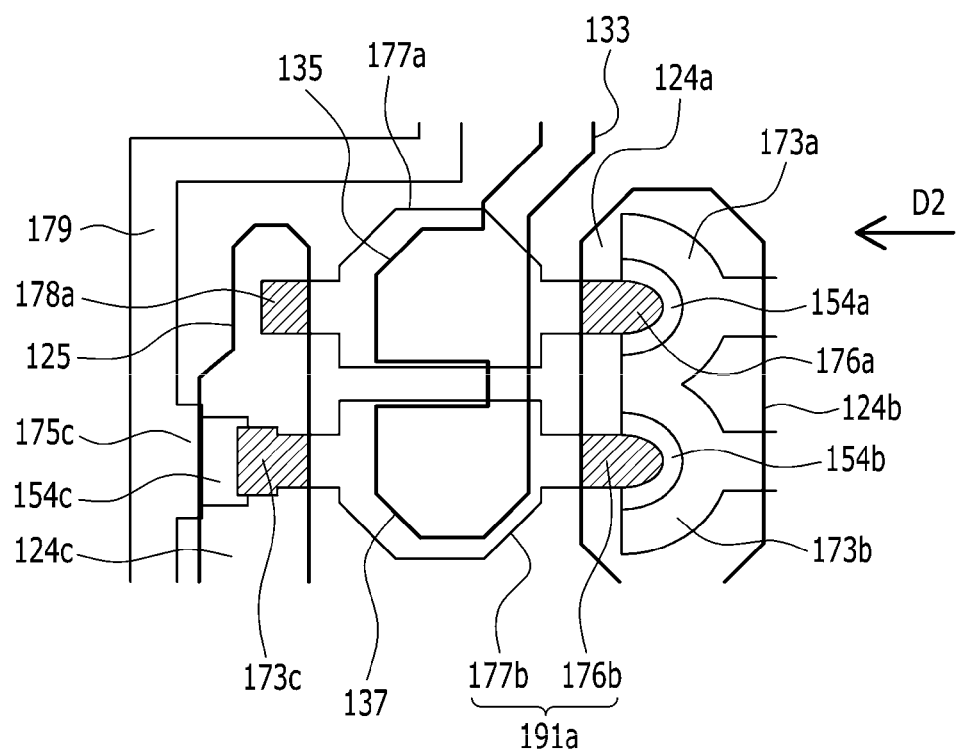

In FIG. 11 to FIG. 13, a portion where the first gate electrode 124a and the first drain electrode 175a overlap is referred to as a first overlapping region R1, and a portion where the second gate electrode 124b and the second drain electrode 175b overlap is referred to as a second overlapping region R2. A portion where the auxiliary electrode 125 and the first drain electrode 175a overlap is referred to as a third overlapping region R3, and a portion where the third gate electrode 124c and the third source electrode 173c overlap is referred to as a fourth overlapping region R4.

In first overlapping region R1, the second overlapping region R2, the third overlapping region R3, and the fourth overlapping region R4, two electrodes overlap via the insulator such that the parasitic capacitance is generated. As these overlapping areas are increased, the magnitude of the parasitic capacitance is increased. If the parasitic capacitance is increased, a kickback voltage is increased such that luminance of the first subpixel PXa and the second subpixel PXb is decreased.

The magnitude of the first overlapping region R1 and the third overlapping region R3 affects the luminance of the first subpixel PXa, and the magnitude of the second overlapping region R2 and the fourth overlapping region R4 affects the luminance of the second subpixel PXb.

Referring to FIG. 12, when the data metal layer is moved in the direction D1, the position of the first overlapping region R1, the second overlapping region R2, the third overlapping region R3, and the fourth overlapping region R4 is changed. More specifically, in this case, the position of the first overlapping region R1, the second overlapping region R2, the third overlapping region R3, and the fourth overlapping region R4 is moved downwardly. However, the areas of the first overlapping region R1, the second overlapping region R2, the third overlapping region R3, and the fourth overlapping region R4 remains constant.

Although not shown, although the data metal layer is moved in the direction opposite to the direction D1, the position of the first overlapping region R1, the second overlapping region R2, the third overlapping region R3, and the fourth overlapping region R4 is changed. The position of the first overlapping region R1, the second overlapping region R2, the third overlapping region R3, and the fourth overlapping region R4 is moved upward. In this case, the area of the first overlapping region R1, the second overlapping region R2, the third overlapping region R3, and the fourth overlapping region R4 is constantly maintained.

Referring to FIG. 13, when the data metal layer is moved in the direction D2, the positions of the first overlapping region R1, the second overlapping region R2, the third overlapping region R3, and the fourth overlapping region R4 are changed. In this case, the areas of the first overlapping region R1, the second overlapping region R2, the third overlapping region R3, and the fourth overlapping region R4 are changed. The areas of the first overlapping region R1 and the second overlapping region R2 are decreased. The areas of the third overlapping region R3 and the fourth overlapping region R4 are increased.

Since the area of the third overlapping region R3 is increased by the reduction area of the first overlapping region R1, the area sum of the first overlapping region R1 and the third overlapping region R3 remains constant. Although each area of the first overlapping region R1 and the third overlapping region R3 is changed by the misalignment of the mask, the area sum of the first overlapping region R1 and the third overlapping region R3 is not changed such that the parasitic capacitance is constantly maintained. Accordingly, the luminance of the first subpixel PXa is not affected.

Since the area of the fourth overlapping region R4 is increased by the reduction area of the second overlapping region R2, the area sum of the second overlapping region R2 and the fourth overlapping region R4 remains constant. Although each area of the second overlapping region R2 and the fourth overlapping region R4 is changed by the misalignment of the mask, the area sum of the second overlapping region R2 and the fourth overlapping region R4 is not changed, and that the parasitic capacitance remains constant. Accordingly, the luminance of the second subpixel PXb is not affected.

Although not shown, when the data metal layer is moved in the direction opposite to the direction D2, the positions of the first overlapping region R1, the second overlapping region R2, the third overlapping region R3, and the fourth overlapping region R4 are not changed. In this case, the areas of the first overlapping region R1, the second overlapping region R2, the third overlapping region R3, and the fourth overlapping region R4 are changed. The areas of the first overlapping region R1 and the second overlapping region R2 are increased. The areas of the third overlapping region R3 and the fourth overlapping region R4 are decreased.

Since the area of the third overlapping region R3 is decreased by the increasing area of the first overlapping region R1, the area sum of the first overlapping region R1 and the third overlapping region R3 remains constant. Although each area of the first overlapping region R1 and the third overlapping region R3 is changed by the misalignment of the mask, the combined area of the first overlapping region R1 and the third overlapping region R3 is not changed. Hence, the parasitic capacitance remains constant. Accordingly, the luminance of the first subpixel PXa is not affected.

Since the area of the fourth overlapping region R4 is decreased by the increasing area of the second overlapping region R2, the area sum of the second overlapping region R2 and the fourth overlapping region R4 remains constant. Although each area of the second overlapping region R2 and the fourth overlapping region R4 is changed by the misalignment of the mask, the area sum of the second overlapping region R2 and the fourth overlapping region R4 is not changed such that the parasitic capacitance is constantly maintained. Accordingly, the luminance of the second subpixel PXb is not affected.

Next, the liquid crystal display according to an exemplary embodiment will be described with reference to FIG. 14 to FIG. 18.

The liquid crystal display according to an exemplary embodiment shown in FIG. 14 to FIG. 18 is the same as most of the liquid crystal display according to an exemplary embodiment shown in FIG. 1 to FIG. 10 and hence, any redundant description is omitted. In the present exemplary embodiment, the adjacent shielding electrodes are connected to each other differently from the previous exemplary embodiment, and this will be further described.

Figure 14:
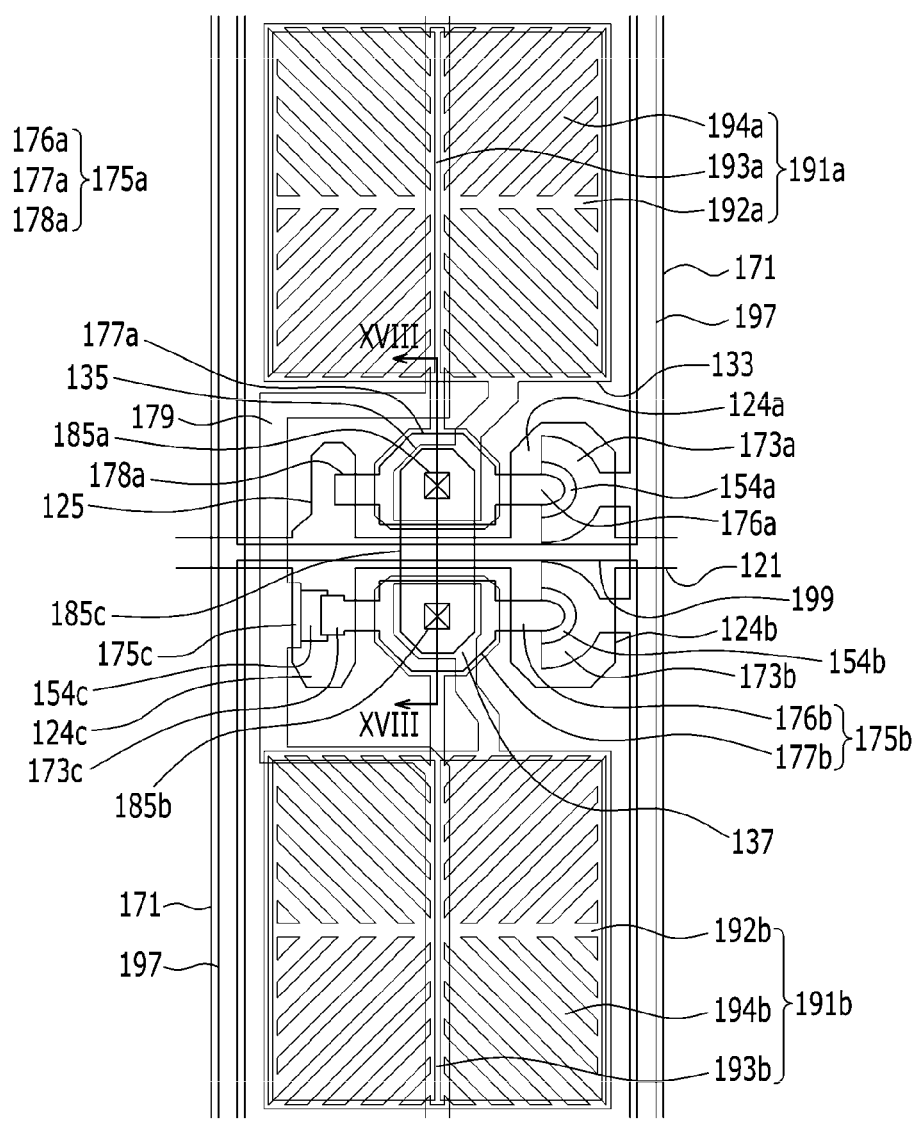
FIG. 14 is a top plan view of a liquid crystal display according to an exemplary embodiment of the present invention.
Figure 15:
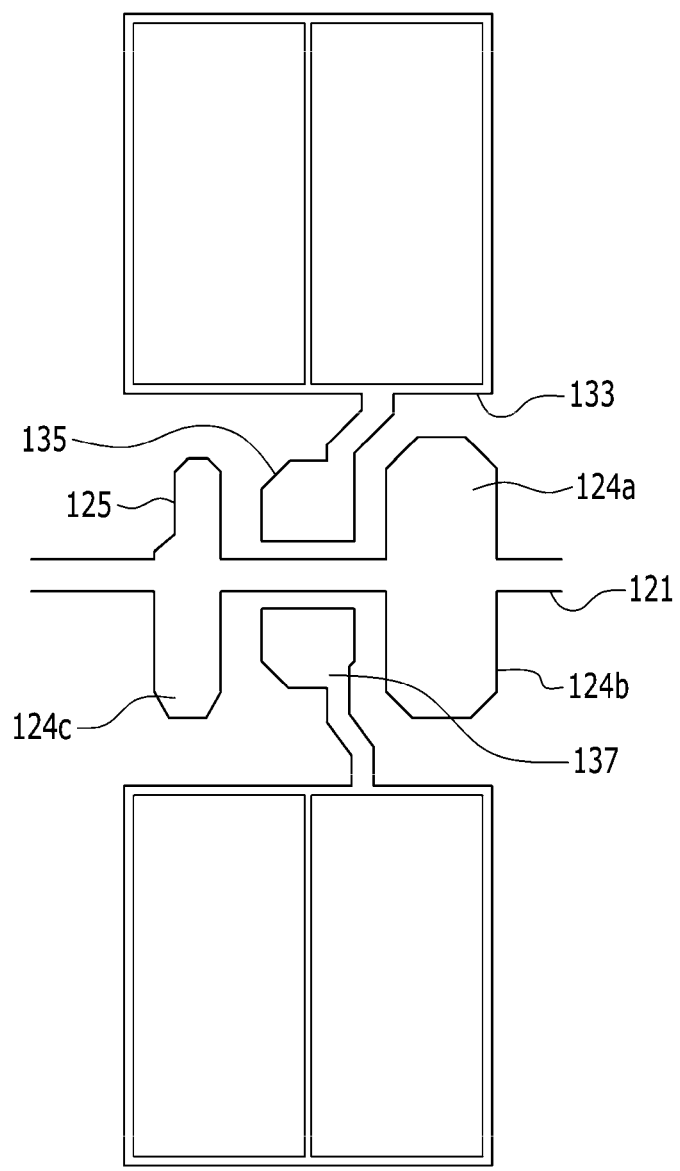
FIGS. 15, 16, and FIG. 17 are top plan views showing a partial layer of a liquid crystal display according to an exemplary embodiment of the inventive concept.
Figure 16:
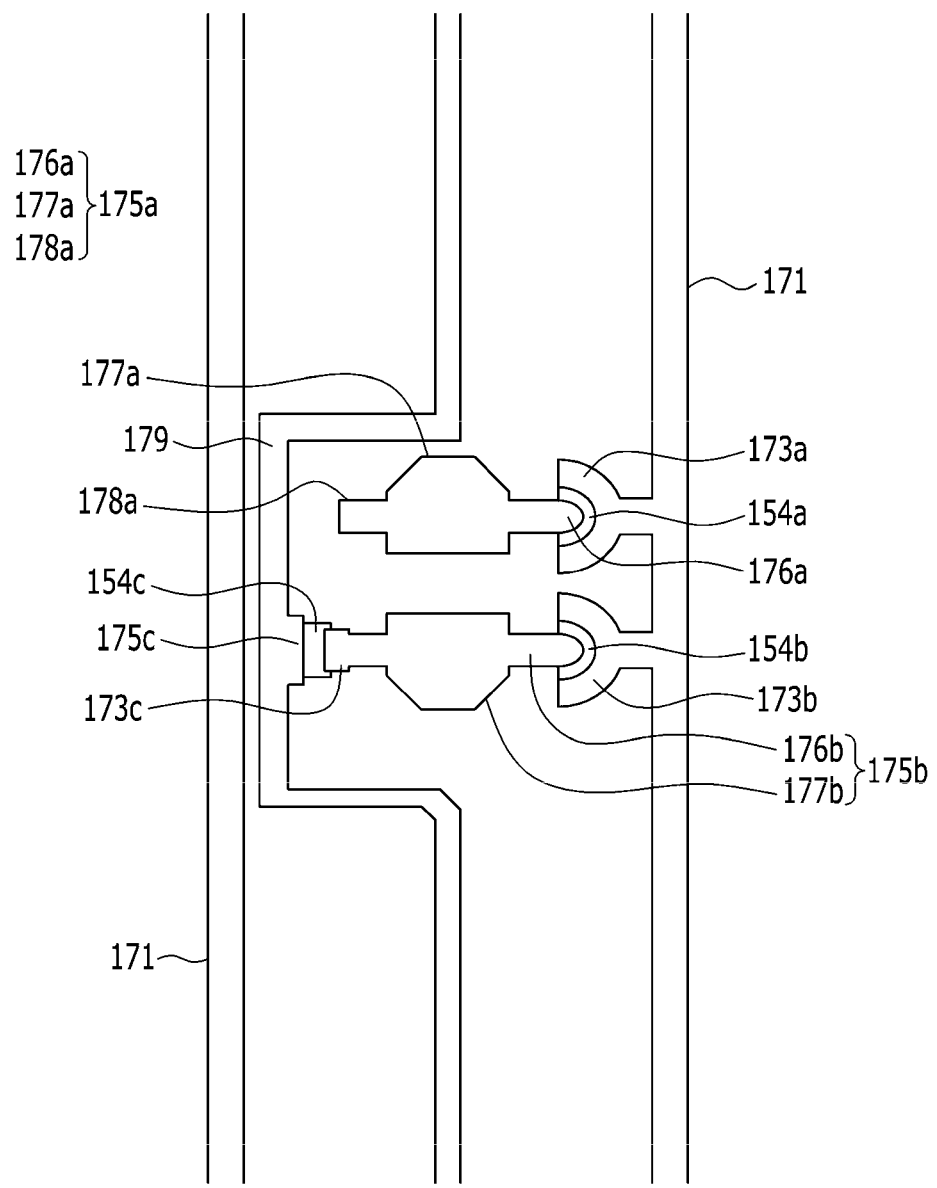
Figure 17:
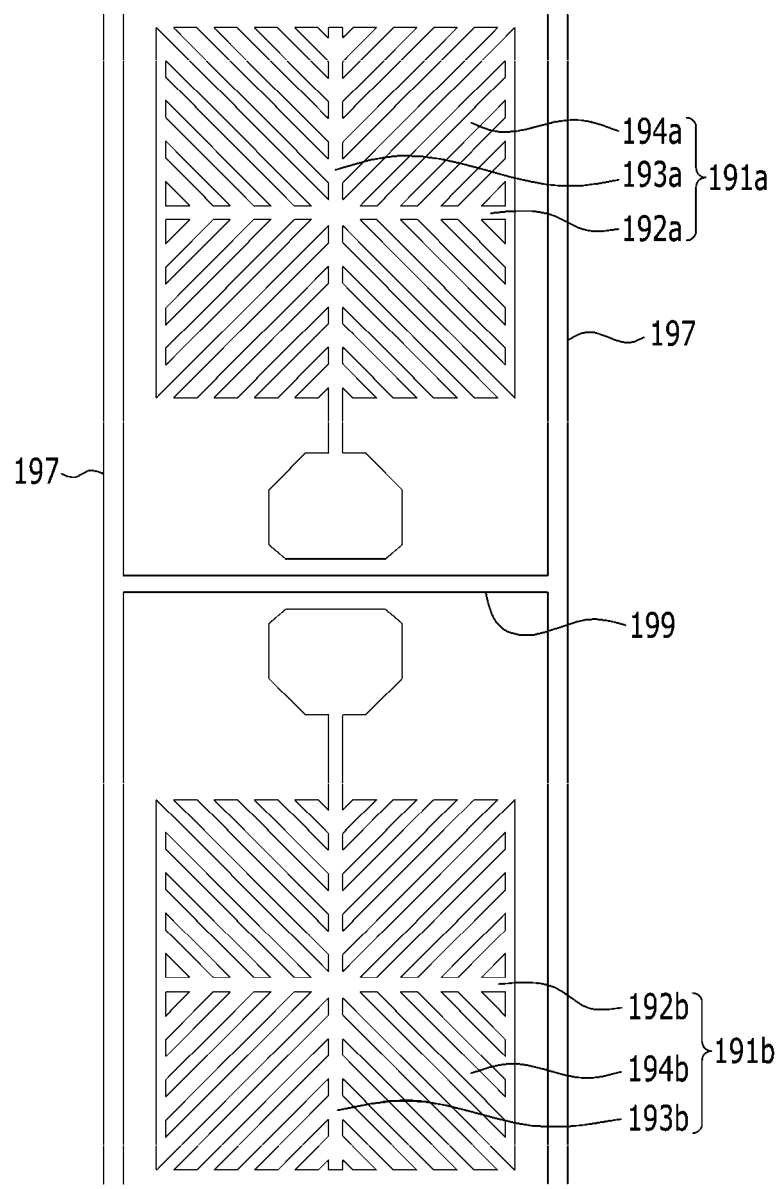
Figure 18:
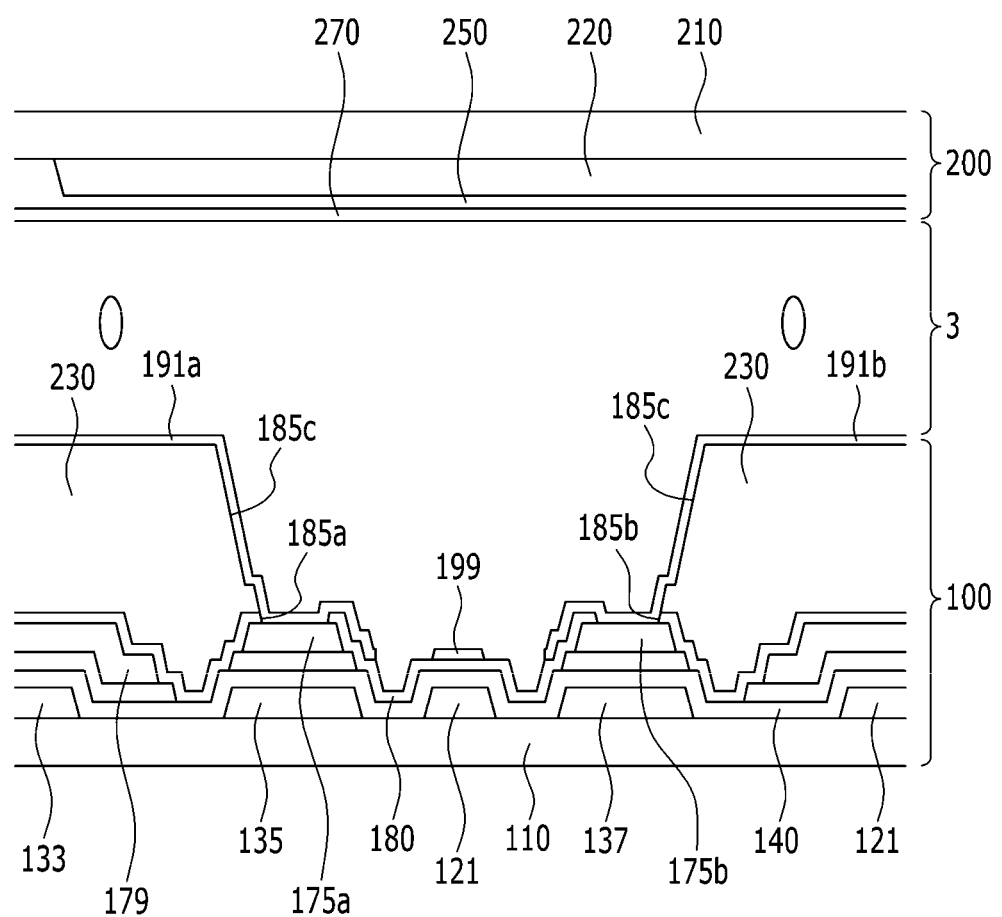
FIG. 18 is a cross-sectional view of a liquid crystal display according to an exemplary embodiment of the inventive concept taken along a line XVIII-XVIII of FIG. 14.

FIG. 14 is a top plan view of a liquid crystal display according to an exemplary embodiment, and FIG. 15 to FIG. 17 are top plan views showing a partial layer of a liquid crystal display according to an exemplary embodiment, respectively. FIG. 15 shows the gate metal layer, FIG. 16 shows the data metal layer, and FIG. 17 shows the layer in which the first subpixel electrode, the second subpixel electrode, and the shielding electrode are formed. FIG. 18 is a cross-sectional view of a liquid crystal display according to an exemplary embodiment taken along a line XVIII-XVIII of FIG. 14.

Like the previous exemplary embodiment, the liquid crystal display according to an exemplary embodiment includes the thin film transistor array panel 100 and the opposite display panel 200 facing each other, and the liquid crystal layer 3 interposed therebetween.

In the case of the thin film transistor array panel 100, the gate metal layer including the gate line 121, the first gate electrode 124a, the second gate electrode 124b, the auxiliary electrode 125, and the third gate electrode 124c is formed on the first substrate 110.

The gate line 121 mainly extends in a row direction and transmits the gate signal. The first gate electrode 124a and the auxiliary electrode 125 protrude upward from the gate line 121. The second gate electrode 124b and the third gate electrode 124c protrude upward from the gate line 121. The first gate electrode 124a and the second gate electrode 124b protrude in the column direction from one position of the gate line 121, respectively. The auxiliary electrode 125 and the third gate electrode 124c protrude in the column direction from different positions of the gate line 121, respectively. "Upward direction," as used herein, refers to a direction going from the second subpixel electrode 191b to the first subpixel electrode 191a.

The first gate electrode 124a and the auxiliary electrode 125 are separated from each other by a predetermined interval. The second gate electrode 124b and the third gate electrode 124c are separated from each other by a predetermined interval.

The storage electrode 133 may be further formed on the first substrate 110, and the first electrode 135 and the second electrode 137 extending from the storage electrode 133 are formed.

The gate insulating layer 140 is formed on the gate line 121, the first gate electrode 124a, the second gate electrode 124b, the third gate electrode 124c, the storage electrode 133, the first electrode 135, and the second electrode 137. The first semiconductor 154a, the second semiconductor 154b, and the third semiconductor 154c are formed on the gate insulating layer 140. The data metal layer including the storage electrode line 179, the data line 171, the first source electrode 173a, the first drain electrode 175a, the second source electrode 173b, the second drain electrode 175b, the third source electrode 173c, and the third drain electrode 175c is formed on the first, second and third semiconductor 154a, 154b, and 154c and the gate insulating layer 140.

The first passivation layer 180 is formed on the data line 171, the first, second, and third source electrodes 173a, 173b, and 173c, and the first, second, and third drain electrodes 175a, 175b, and 175c.

The first passivation layer 180 has the first contact hole 185a exposing at least a portion of the first drain electrode 175a and the second contact hole 185b exposing at least a portion of the second drain electrode 175b. The first contact hole 185a and the second contact hole 185b are adjacent to each other. The first contact hole 185a and the second contact hole 185b are aligned in a column direction, and the gate line 121 is positioned between the first contact hole 185a and the second contact hole 185b.

The second passivation layer 230 is formed on the first passivation layer 180.

The second passivation layer 230 has an opening 185c, and the opening 185c overlaps the first contact hole 185a and the second contact hole 185b. The opening 185c is formed of the single opening 185c, and is not formed at the position completely overlapping the first contact hole 185a and the position completely overlapping the second contact hole 185b. Accordingly, the opening 185c exposes the first passivation layer 180 positioned between the first contact hole 185a and the second contact hole 185b. The edge of the opening 185c encloses the edge of the first contact hole 185a and the second contact hole 185b.

The first subpixel electrode 191a and the second subpixel electrode 191b are formed on the second passivation layer 230.

The shielding electrode 197 is formed on the second passivation layer 230. The shielding electrode 197 may be formed at the same layer as the first subpixel electrode 191a and the second subpixel electrode 191b. The shielding electrode 197 may overlap the data line 171.

A connection electrode 199 connecting adjacent shielding electrodes 197 to each other is further formed on the second passivation layer 230. The connection electrode 199 may be formed at the same layer as the first subpixel electrode 191a, the second subpixel electrode 191b, and the shielding electrode 197. The connection electrode 199 may overlap the gate line 121 and extends in the direction parallel to the gate line 121. The connection electrode 199 may be positioned between the first contact hole 185a and the second contact hole 185b.

While this inventive concept has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims and the above description.

DESCRIPTION OF SYMBOLS

121: gate line
124a: first gate electrode
124b: second gate electrode
124c: third gate electrode
125: auxiliary electrode
133: storage electrode
135: first electrode
137: second electrode
171: data line
173a: first source electrode
173b: second source electrode
173c: third source electrode
175a: first drain electrode
175b: second drain electrode
175c: third drain electrode
176a: first bar part
177a: first expansion part
178a: second bar part
176b: third bar part
177b: second expansion part
179: storage electrode line
180: first passivation layer
230: second passivation layer
185a: first contact hole
185b: second contact hole
185c: opening
191a: first subpixel electrode
191b: second subpixel electrode
197: shielding electrode
199: connection electrode
270: common electrode

What is claimed is:
1. A liquid crystal display comprising:
a first substrate;
a gate line, a data line, and a storage electrode line positioned on the first substrate;
a first gate electrode and a second gate electrode protruding from the gate line;
an auxiliary electrode protruding from the gate line in the same direction as the first gate electrode;
a third gate electrode protruding from the gate line in the same direction as the second gate electrode;
a first source electrode connected to the data line and overlapping the first gate electrode;
a second source electrode connected to the data line and overlapping the second gate electrode;
a first drain electrode separated from the first source electrode and overlapping the first gate electrode and the auxiliary electrode;

a second drain electrode separated from the second source electrode and overlapping the second gate electrode;
a third source electrode connected to the second drain electrode and overlapping the third gate electrode;
a third drain electrode separated from the third source electrode, overlapping the third gate electrode, and connected to the storage electrode line;
a first subpixel electrode connected to the first drain electrode; and
a second subpixel electrode connected to the second drain electrode,
wherein a connection of the first drain electrode and the first subpixel electrode and a connection of the second drain electrode and the second subpixel electrode are adjacent to each other.

2. The liquid crystal display of claim 1, further comprising:
a first passivation layer positioned on the data line, the first source electrode, the second source electrode, the first drain electrode, the second drain electrode, the third source electrode, and the third drain electrode; and
a second passivation layer positioned on the first passivation layer,
wherein the first subpixel electrode and the second subpixel electrode are positioned on the second passivation layer,
the first passivation layer has a first contact hole exposing at least a portion of the first drain electrode and a second contact hole exposing at least a portion of the second drain electrode, and
the second passivation layer has a single opening overlapping the first contact hole and the second contact hole.

3. The liquid crystal display of claim 2, wherein
the opening exposes a portion of the first passivation layer positioned between the first contact hole and the second contact hole.

4. The liquid crystal display of claim 2, wherein:
the first passivation layer is formed of an inorganic insulating material; and
the second passivation layer is formed of an organic insulating material.

5. The liquid crystal display of claim 4, wherein
the second passivation layer is formed of a color filter.

6. The liquid crystal display of claim 2, wherein
the first contact hole is positioned between the first gate electrode and the auxiliary electrode.

7. The liquid crystal display of claim 6, wherein
the first drain electrode includes:
a first bar part overlapping the first gate electrode;
a first expansion part extended from the first bar part and positioned between the first gate electrode and the auxiliary electrode; and
a second bar part extended from the first expansion part and overlapping the auxiliary electrode.

8. The liquid crystal display of claim 7, wherein
the first contact hole exposes the first expansion part.

9. The liquid crystal display of claim 7, further comprising:
a storage electrode overlapping an edge of the first subpixel electrode and the second subpixel electrode; and
a first electrode extending from the storage electrode and overlapping the first expansion part of the first drain electrode.

10. The liquid crystal display of claim 7, wherein
the first bar part, the first expansion part, and the second bar part are positioned in the direction parallel to the gate line on one straight line.

11. The liquid crystal display of claim 2, wherein
the second contact hole is positioned between the second gate electrode and the third gate electrode.

12. The liquid crystal display of claim 11, wherein
the second drain electrode includes:
a third bar part overlapping the second gate electrode; and
a second expansion part extending from the third bar part and positioned between the second gate electrode and the third gate electrode.

13. The liquid crystal display of claim 12, wherein
the second contact hole exposes the second expansion part.

14. The liquid crystal display of claim 12, further comprising:
a storage electrode overlapping an edge of the first subpixel electrode and the second subpixel electrode; and
a second electrode extended from the storage electrode and overlapping the second expansion part of the second drain electrode.

15. The liquid crystal display of claim 12, wherein
the second bar part, the second expansion part, and the third bar part are positioned in the direction parallel to the gate line on one straight line.

16. The liquid crystal display of claim 2, wherein
the first contact hole and the second contact hole are positioned in the direction parallel to the data line on one straight line.

17. The liquid crystal display of claim 2, wherein
the first subpixel electrode and the second subpixel electrode respectively include:
a crossed-shaped branch unit including a horizontal stem and a vertical stem; and
a minute branch extended from the crossed-stem, and
the storage electrode line overlaps the vertical stem.

18. The liquid crystal display of claim 17, wherein
the storage electrode line is positioned at the same layer as the data line.

19. The liquid crystal display of claim 2, wherein
the first gate electrode, the second gate electrode, the third gate electrode, and the auxiliary electrode protrude from the gate line.

20. The liquid crystal display of claim 2, wherein:
the first gate electrode and the auxiliary electrode protrude from the gate line; and
the second gate electrode and the third gate electrode protrude from the gate line, in an opposite direction from the first gate electrode and the auxiliary electrode.

21. The liquid crystal display of claim 2, further comprising
a shielding electrode overlapping the data line.

22. The liquid crystal display of claim 21, wherein
the shielding electrode is positioned at the same layer as the first subpixel electrode and the second subpixel electrode.

23. The liquid crystal display of claim 21, further comprising
a connection electrode connecting the adjacent shielding electrodes.

24. The liquid crystal display of claim 23, wherein
the connection electrode overlaps the gate line.

25. The liquid crystal display of claim 24, wherein the connection electrode is positioned between the first contact hole and the second contact hole.

\* \* \* \* \*